US009252579B2

(12) United States Patent
Korcz et al.

(10) Patent No.: US 9,252,579 B2
(45) Date of Patent: Feb. 2, 2016

(54) ELECTRICAL BOX COVER ASSEMBLY

(71) Applicant: Hubbell Incorporated, Shelton, CT (US)

(72) Inventors: Krzysztof W. Korcz, Grainger, IN (US); Steven J. Johnson, Buchanan, MI (US)

(73) Assignee: HUBBELL INCORPORATED, Shelton, CT (US)

( * ) Notice: Subject to any disclaimer, the term of this patent is extended or adjusted under 35 U.S.C. 154(b) by 206 days.

(21) Appl. No.: 13/804,346

(22) Filed: Mar. 14, 2013

(65) Prior Publication Data
US 2014/0262417 A1    Sep. 18, 2014

(51) Int. Cl.
| | |
|---|---|
| *H01H 9/02* | (2006.01) |
| *H02G 3/08* | (2006.01) |
| *H02G 3/10* | (2006.01) |
| *H02G 3/18* | (2006.01) |
| *H02G 3/12* | (2006.01) |
| *H02G 3/14* | (2006.01) |
| *H01H 13/04* | (2006.01) |
| *H01H 19/04* | (2006.01) |
| *H01H 21/04* | (2006.01) |
| *H01H 23/04* | (2006.01) |
| *H01R 13/46* | (2006.01) |
| *H05K 5/00* | (2006.01) |
| *H01R 13/502* | (2006.01) |

(52) U.S. Cl.
CPC .................. *H02G 3/081* (2013.01); *H02G 3/08* (2013.01); *H02G 3/083* (2013.01); *H02G 3/085* (2013.01); *H02G 3/086* (2013.01); *H02G 3/10* (2013.01); *H02G 3/12* (2013.01); *H02G 3/14* (2013.01); *H02G 3/18* (2013.01)

(58) Field of Classification Search
CPC ......... H02G 3/08; H02G 3/081; H02G 3/083; H02G 3/085; H02G 3/086; H02G 3/10; H02G 3/12; H02G 3/14; H02G 3/18
USPC ........... 174/50, 520, 559, 560, 561, 562, 563, 174/53, 54, 55, 56, 57, 58, 61, 66, 67
See application file for complete search history.

(56) References Cited

U.S. PATENT DOCUMENTS

| | | | | |
|---|---|---|---|---|
| 4,948,317 | A | * | 8/1990 | Marinaro ........................ 411/535 |
| 5,023,396 | A | * | 6/1991 | Bartee et al. ................... 174/486 |
| 5,176,345 | A | | 1/1993 | Medlin |
| 5,486,650 | A | * | 1/1996 | Yetter .............................. 174/53 |
| 6,576,835 | B1 | | 6/2003 | Ford et al. |

(Continued)

*Primary Examiner* — Hoa C Nguyen
*Assistant Examiner* — Binh Tran
(74) *Attorney, Agent, or Firm* — Dickinson Wright PLLC

(57) ABSTRACT

An electrical box cover assembly includes a base having a central opening and a collar encircling the central opening. A sleeve slides through the collar and is adjusted to a selected position by manually moving the sleeve and then locking the sleeve in place by a locking device. An expandable locking device contacts an inner surface of the sleeve to lock the position of the sleeve with respect to the base. In one embodiment, the inner surface of the sleeve has at least one channel that extends in an axial direction with respect to an axial passage in the sleeve. The locking device expands outwardly to engage the opposing surfaces of the channel to prevent axial movement of the sleeve. A divider plate can be coupled to the sleeve to move with the sleeve and divide the electrical box into separate compartments. The divider can have fixed plate attached to the electrical box and movable plate coupled to the movable sleeve that slide on the fixed plate.

30 Claims, 10 Drawing Sheets

(56) References Cited

U.S. PATENT DOCUMENTS

| | | |
|---|---|---|
| 6,653,561 B2 | 11/2003 | Lalancette et al. |
| 7,479,598 B1 | 1/2009 | Shotey et al. |
| 7,645,936 B2 | 1/2010 | Magno, Jr. |
| 8,076,577 B2 | 12/2011 | Mango et al. |
| 2004/0155036 A1* | 8/2004 | Wegner et al. ............. 220/3.2 |
| 2008/0156514 A1 | 7/2008 | Webb |
| 2010/0252552 A1 | 10/2010 | Nikayin et al. |

* cited by examiner

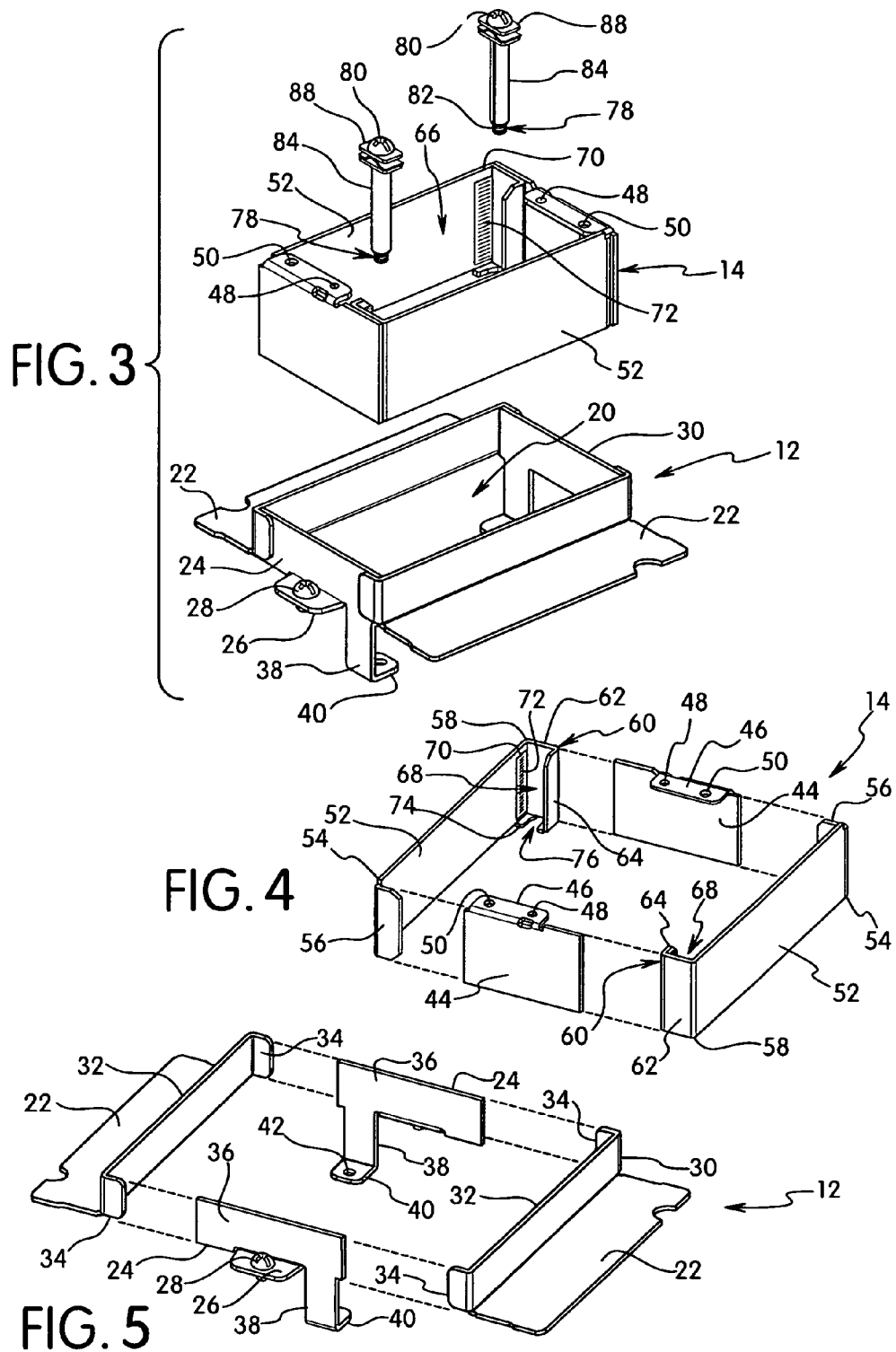

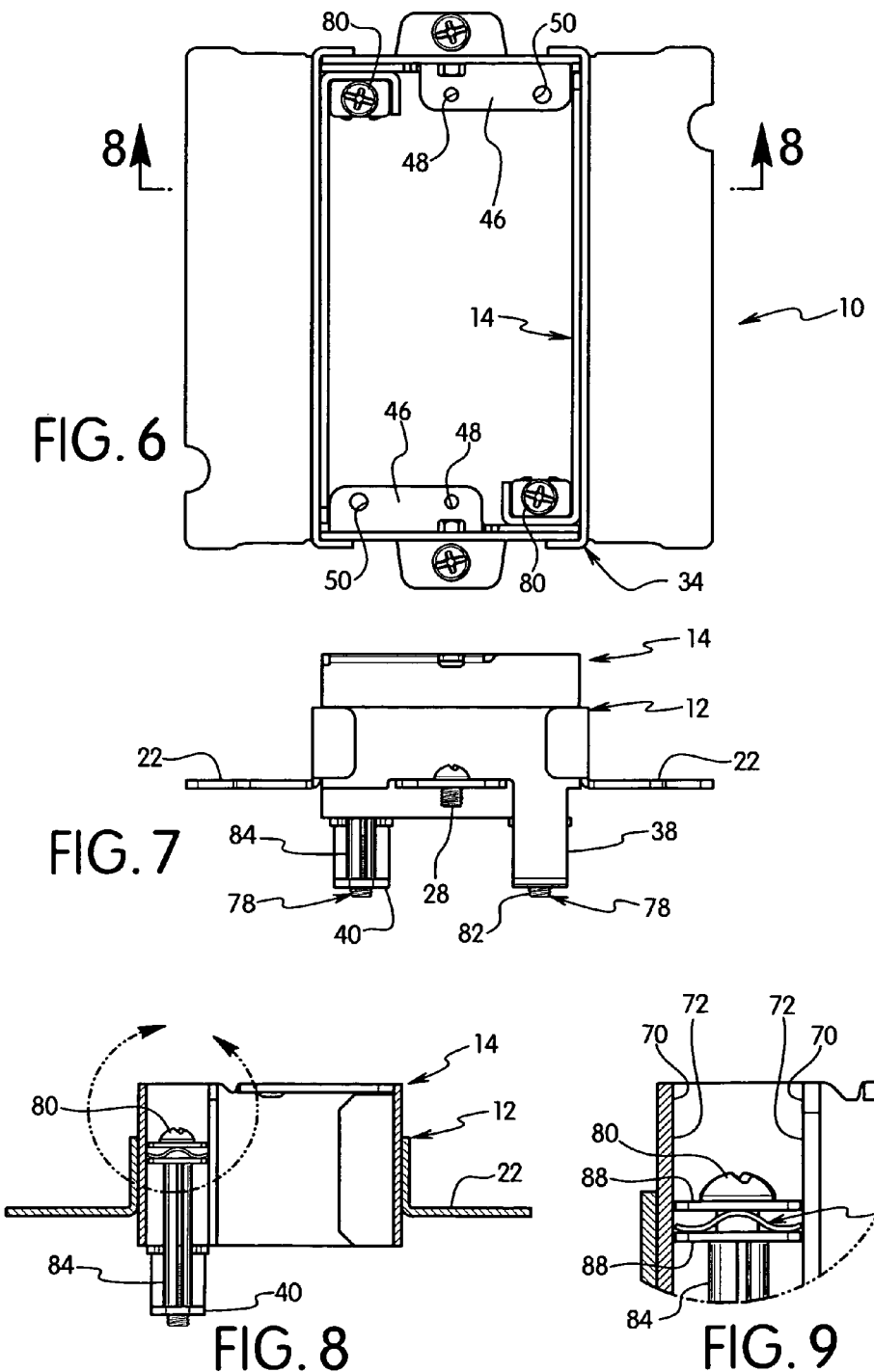

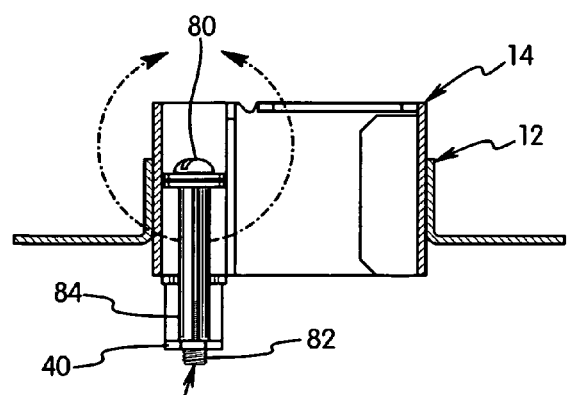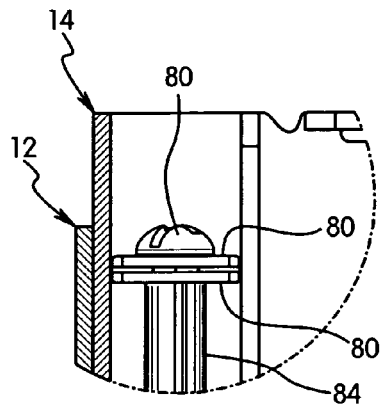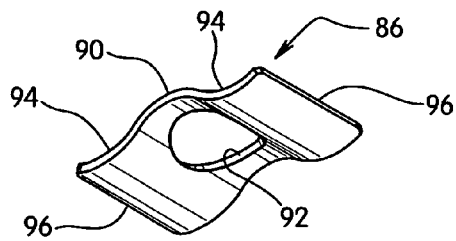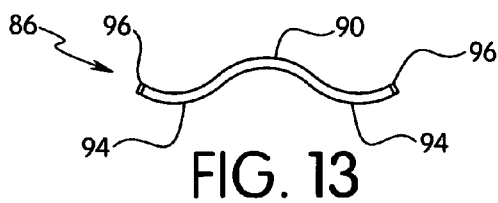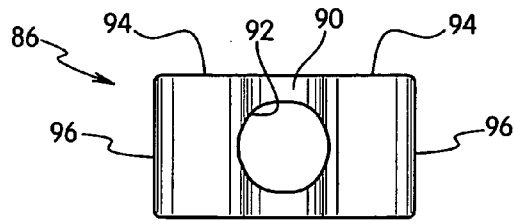

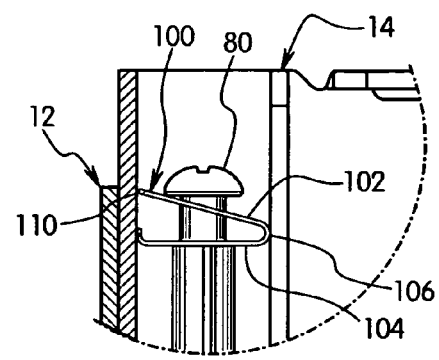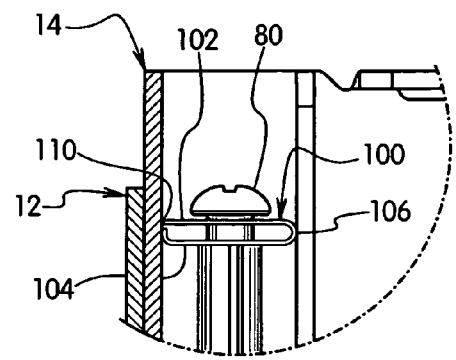
FIG. 15    FIG. 16
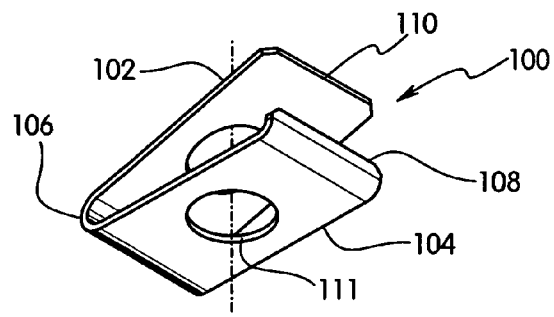
FIG. 17
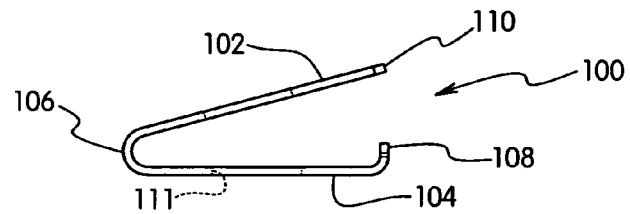
FIG. 18
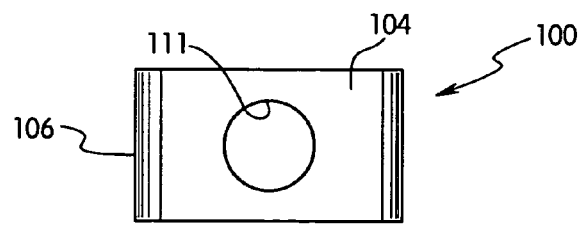
FIG. 19

ELECTRICAL BOX COVER ASSEMBLY

FIELD OF THE INVENTION

The present invention is directed to an adjustable electrical box cover plate assembly that can be attached to a mounting plate of an electrical box or directly to the open end of a conventional electrical junction box. The invention is further directed to an adjustable electrical box cover plate having a movable sleeve for allowing adjustment of the position of the electrical device to compensate for different wall thicknesses to set the electrical device at the desired position in relation to the exterior surface of the wall

BACKGROUND OF THE INVENTION

Electrical boxes are commonly mounted to a stud or other support structure for supporting an electrical device and enclosing electrical wiring. The electrical boxes are often mounted in a variety of positions and locations in the wall or ceiling. The electrical box is typically attached to the stud or other support structure by nails, screws or other fasteners. In new construction, the electrical box is attached to the building stud with the open front face of the electrical box positioned so that the outer face of the drywall or paneling is essentially flush with the outer edge of the electrical box. In some forms of construction, the stud or other structure does not allow proper orientation of the electrical box so that the open end of the electrical box is recessed with respect to the outer surface of the wall when the wall is installed and finished.

Renovating old construction also can create difficulties in positioning the electrical box with respect to the outer surface of the wall. New wall board or paneling can be applied over existing walls so that the original electrical box is recessed within the wall and is not easily moved or relocated. The recessed electrical box results in the electrical device being recessed with respect to the wall and is not easily accessible.

A number of devices have been proposed providing an adjustable assembly for connecting to an outlet box that can accommodate different thicknesses of wall structures and the spacing between the outer surface of a wall and an electrical box. One example is disclosed in U.S. Pat. No. 4,634,015 to Taylor which includes a plate and an open collar disposed on the mounting plate about a central opening. A box frame slides within the collar to contact the side walls of the collar. Adjustment screws are mounted in the box to connect the frame to the collar or the mounting plate to move the box outwardly of the collar.

U.S. Pat. Nos. 7,645,936 and 8,076,577 to Magno, Jr. disclose a two gang adjustable mud ring. The adjustable mud ring includes a mounting plate for mounting to the open end of an electrical box. The mounting plate includes a collar forming an opening where the collar includes an inwardly extending tab. An extension sleeve slides within the opening of the collar. The extension sleeve has a U-shaped channel along an exterior side wall that allows the tab to travel within the channel. A fastener and wedge-shaped locking devices are coupled to the tab to engage the extension sleeve to lock the extension sleeve in place.

U.S. Pat. No. 6,576,835 to Ford et al. discloses a multi gang junction box. The junction box includes a plurality of removable partition plates that can slide into place within grooves on the inner face of the electrical box U.S. Pat. No. 6,653,561 to Lalancette et al. discloses an electrical box with a removable partition plate. The partition plate has a frangible end portion which can be broken and removed to alter the length of the partition plate.

U.S. Patent Publication No. 2008/0156514 to Webb discloses an adjustable electrical box assembly. The assembly includes a mounting plate with an opening and a box ring slidably received within the opening of the mounting plate. A flange extends outwardly from the wall of the box ring around one of the ends of the box ring. An adjustment mechanism extends between the flange of the box ring and the mounting plate to selectively adjust the distance between the mounting plate and the flange. The flange is in turn mounted directly to the electrical box so that the electrical box moves with the position of the box ring.

Another example is disclosed in U.S. Pat. No. 5,931,325 to Filipov. This patent discloses an adjustable mud ring for an electrical box having a plate that can be attached to an electrical box and a collar extending outwardly from the plate. A movable sleeve surrounds the collar and is attached to the collar by screws that adjust the position.

Still another example is disclosed in U.S. Pat. No. 6,820,760 to Wegner et al. which discloses an electrical box extension having an extending member for a switch and/or electrical receptacle. The extension member includes fastener brackets and a fastener base bracket. Fasteners extend through the fastener brackets of the base bracket to adjust the relative position of the extending member to the base. Similar adjustable electrical box extensions are disclosed in U.S. Patent Application Publication No. 2005/0051354 and 2005/0082079 to Wegner et al.

Examples of other electrical boxes having an adjustable sleeve or collar to position the electrical device with respect to the electrical box are disclosed in U.S. Pat. No. 915,381 to Pullets, U.S. Pat. No. 740,663 to Krantz, U.S. Pat. No. 1,875,101 to Morrell, U.S. Pat. No. 2,707,221 to Frank and U.S. Pat. No. 7,301,099 to Korcz.

While the prior devices are generally suitable for the intended purpose, there is a continuing need in the industry for an improved device for mounting an electrical component to an electrical box.

SUMMARY OF THE INVENTION

The present invention is directed to an electrical box cover plate for coupling directly to a mounting plate on an electrical box or to the open end of an electrical box. The invention is further directed to an electrical box cover assembly having an adjustable assembly for accommodating the depth of the opening in the wall structure and the spacing between the outer surface of the wall and the electrical box.

Accordingly, one aspect of the invention is to provide an electrical box cover plate for attaching to an electrical box or mounting plate and having a telescoping sleeve for adjusting the position of the electrical device with respect to the electrical box. The telescoping movable sleeve also permits the adjustment of the electrical device with respect to the surface of the wall.

Another feature of the invention is to provide an electrical box cover having an adjustable sleeve for adjusting the position of an electrical wiring device relative to the base so that the electrical wiring device is positioned in the desired position in the wall. The cover of the invention can be a single gang device, a two gang device or a three gang device which can be attached to the open face of a mounting plate on the electrical box.

A divider plate can be coupled to the device to divide the opening in the box cover and the cavity of the electrical box into separate compartments for high voltage and low voltage components.

In an embodiment of the invention, the divider is adjustable to cooperate with the movable sleeve. The divider can have a fixed plate that is attached to the electrical box and second movable plate that is movable with respect to the fixed plate by the sliding movement of the sleeve. The second movable plate is coupled to the fixed plate for sliding movement in the direction of movement of the sleeve. The movable sleeve can be formed from a single piece of sheet metal that is bent into a U-shape so that the two sides overlie the outer surfaces of the fixed plate and slide in a linear direction with respect to the fixed plate. The top end of the movable plate is attached to the movable sleeve so that the movable plate moves simultaneously with the sleeve.

A further feature of the invention is to provide an electrical box cover plate having a base plate with a central opening and a collar surrounding the opening. A sleeve is slidable within the collar and can move between a retracted position within the electrical box to an extended position.

The electrical box cover plate of the invention includes a cover plate having a central opening and a collar surrounding the opening and having a sliding sleeve within the collar for supporting the electrical device. The sleeve is movable from a retracted position where the top edge of the sleeve is essentially flush with the top edge of the collar and can be moved to an extended position outwardly from the collar to accommodate various thicknesses of a wall structure to position the electrical device flush with the outer surface of the wall structure.

A further feature of the invention is to provide an electrical box cover plate having a central opening with a movable sleeve within the opening where the movable sleeve is adjusted manually by lifting the sleeve upwardly with respect to the base to a selected position. A locking member is coupled to a screw that compresses the locking member by rotation of the screw to engage a surface of the sleeve. In one embodiment, one end of the adjustment screw is threaded into a tab on the base so that rotation of the screw compresses the locking member causing the locking member to engage the sleeve. In the embodiments of the invention the locking member is a spring that expands outwardly when compressed. The outward expansion of the spring member causes the edges of the spring to grip the surfaces of the sleeve.

The electrical box mounting plate of the invention is typically made of sheet metal that is stamped then folded into a desired form. In one form of the invention, the base is formed with a central opening having two opposing tabs that are folded perpendicular to the plane of the base plate to form two opposing walls of a collar. Separate end wall members are then attached to the ends of the opposing side walls that are integrally formed with the base plate to define the collar on the base plate. In one embodiment, a leg extends from an end wall of the collar and includes an inwardly extending tab with a hole for receiving the locking screw. The tab extends inwardly with respect to the opening in the base to project into the axial passage defined by the opening in the base.

The movable sleeve is typically formed of metal from a blank that can be folded into a rectangular shape. The sleeve can be square, round or any other shape depending on the intended use. In one form of the invention, the top end of the sleeve includes a mounting tab for supporting the electrical device. An inwardly facing channel extends in the axial direction with respect to the axial passage of the sleeve along an inner face of the sleeve. The channel is formed with two opposing side surfaces that are able to contact the locking spring when the spring is compressed to secure the sleeve in a fixed position when the screw is tightened. In one embodiment a channel is provided at each of the opposite corners of the sleeve to receive a screw and locking member at opposite corners of the base.

These and other aspects of the invention are basically attained by providing an adjustable electrical box cover for coupling to an electrical box. The box cover comprises a base having a top side, a bottom side and a central opening having a dimension sufficient to receive an electrical device and defining an axial passage. The base plate is adapted for coupling to the electrical box or to a mounting plate on an electrical box. An inwardly extending tab projects into the opening of the base and is spaced from the bottom side of the base. A sleeve slides in the axial passage of the base and is configured for supporting an electrical wiring device. The sleeve can be positioned relative to the base to selectively adjust the position of the electrical wiring device. A fastener is positioned in the axial passage of the sleeve and is coupled to the tab of the base. A spring is coupled to the fastener. The spring is configured for moving between an unlocked position and a locked position. The fastener compresses the spring and deflects the spring outwardly to engage an inner surface of the sleeve and lock the position of the sleeve relative to the base.

The various aspects of the invention are also attained by providing an electrical box cover plate comprising a base with an opening configured for coupling to an open end of an electrical box. A movable sleeve with an axial passage is received in the opening in the base. A locking member is coupled to the base for locking the position of the sleeve with respect to the base. A divider is configured for dividing the opening in the base and the axial passage in the sleeve. The divider is expandable between a retracted position and extended position, and a portion of the divider plate is movable with movement of the movable sleeve.

The various features of the invention are further attained by providing an electrical box cover plate for coupling to an electrical box. The cover plate comprises an adjustable mounting assembly for an electrical outlet box comprising a base with an opening and a tab extending into the opening. A sleeve is received in the opening for sliding axially within the opening and is configured to support an electrical wiring device. A fastener and compressible locking member are coupled to the tab and are positioned in the opening of the sleeve. The locking member is movable between an unlocked and locked position and is configured to engage an inner surface of the sleeve in the locked position to lock the sleeve in place.

These and other aspects and salient features of the invention will become apparent from the following detailed description of the invention, which taken in conjunction with the annexed drawings, disclose various embodiments of the invention.

BRIEF DESCRIPTION OF THE DRAWINGS

The following is a brief description of the drawings, in which:

FIG. 3 is an exploded view of the cover plate of FIG. 1;

FIG. 4 is a perspective exploded view of the sleeve of FIG. 1;

FIG. 5 is an exploded view of the base of FIG. 1;

FIG. 6 is a top view of the electrical box cover plate;

FIG. 7 is an end view of the electrical box cover plate of FIG. 6;

FIG. 8 is a cross sectional view of the cover plate taken along line 8-8 of FIG. 6 showing the locking member;

FIG. 9 is an enlarged cross sectional view of FIG. 8 showing the locking member in the unlocked position;

FIG. 10 is a cross sectional view of the locking member in the locked position;

FIG. 11 is an enlarge cross sectional view of FIG. 10 showing the locking member in the locked position;

FIG. 12 is a perspective view of the locking spring in one embodiment;

FIG. 13 is an end view of the locking spring of FIG. 12;

FIG. 14 is a top view of the locking spring of FIG. 12;

FIG. 15 is an enlarged cross sectional view showing the locking spring in a second embodiment of the invention;

FIG. 16 is an enlarge view of the locking spring of FIG. 15 showing the spring in the locked position;

FIG. 17 is a perspective view of the spring of FIG. 15;

FIG. 18 is a side elevational view of the spring of FIG. 17;

FIG. 19 is a top view of the spring of FIG. 17;

DETAILED DESCRIPTION OF THE INVENTION

The present invention is directed to an adjustable electrical box cover that can be used to accommodate different thicknesses in wall structure. The invention is particularly directed to an electrical box cover that can adjust the position of the electrical device with respect to the electrical box and the wall surface where the cover has an adjustable and movable partition plate to divide the electrical box and opening in the cover into separate compartments to isolate the wiring in each compartment.

Figure 1:
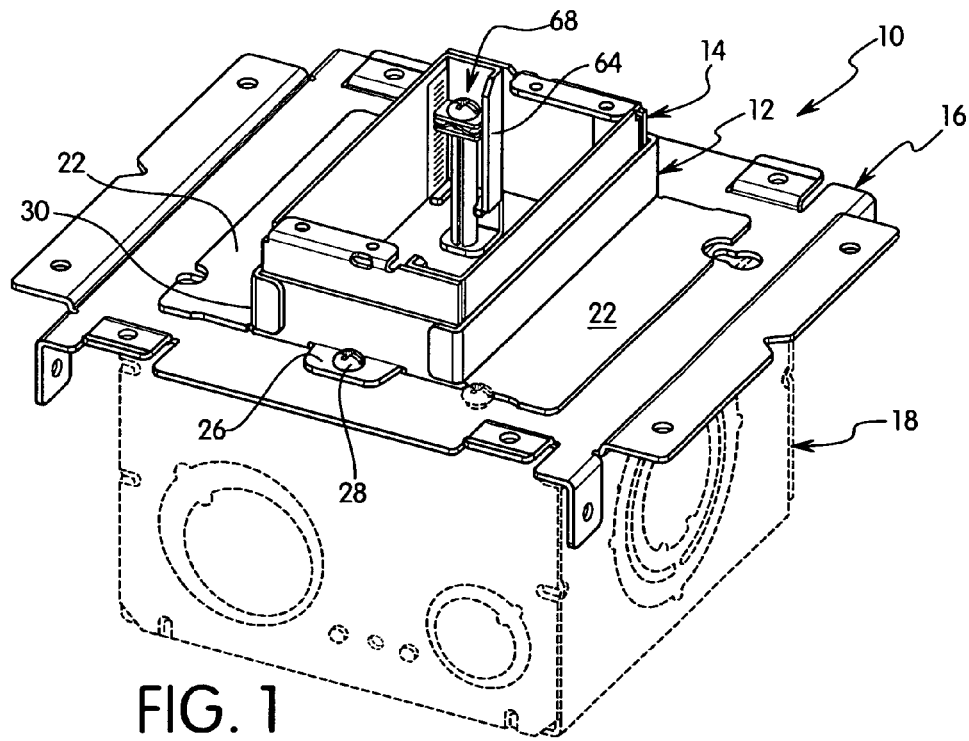
FIG. 1 is a perspective view of the electrical box cover plate in a first embodiment of the invention showing the sleeve recessed in the collar of the base plate.

The box cover assembly 10 of the invention basically includes a base 12 and a movable sleeve 14 as shown in FIG. 1. The position of the sleeve is adjustable with respect to the cover plate 12. The box cover assembly 10 is particularly configured and adapted for mounting to a mounting plate 16 as shown in FIG. 1. In alternative embodiments, the box cover 12 can be attached directly to the open end of an electrical box 18. Typically the mounting plate 16 is coupled to the open end of the electrical box 18 and the box cover 10 is attached to the mounting plate.

Figure 23:
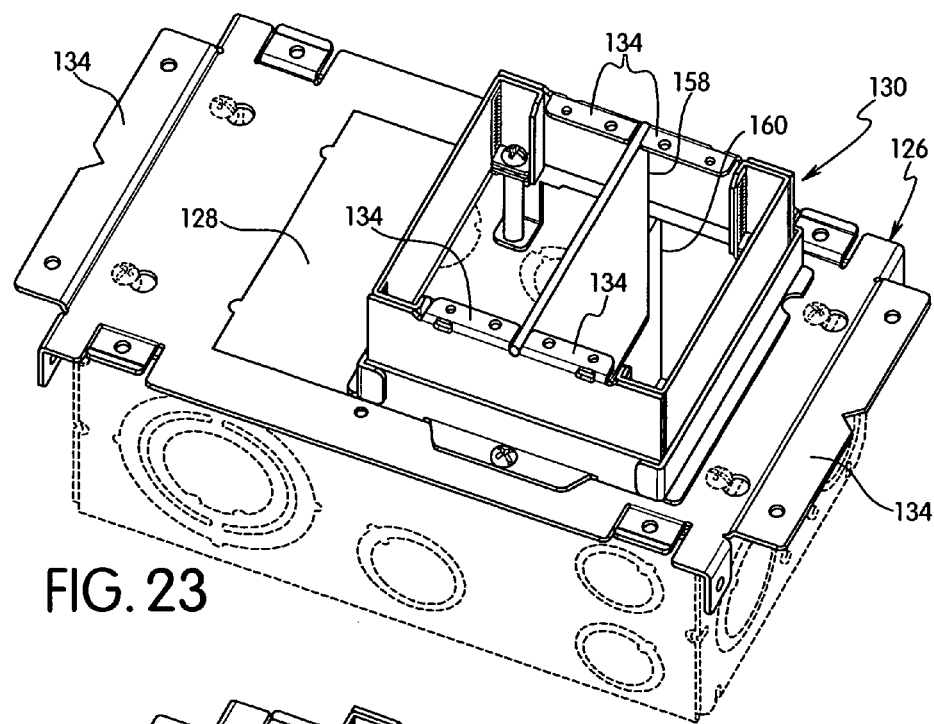
FIG. 23 is perspective view of the two gang cover and mounting plate.

The electrical box cover 10 of the invention basically includes a base 12 and sleeve 14 that slides within the opening of the base. The electrical box cover can be a single gang unit as shown in FIGS. 1-10, a two gang unit shown in FIG. 23, or a three gang unit shown in FIG. 24. In each of the embodiments, the box cover is generally configured for mounting directly to a mounting plate 16. The box cover 10 is constructed for supporting an electrical wiring device (not shown) such as an electrical outlet, switch, or other electrical device.

Figure 2:
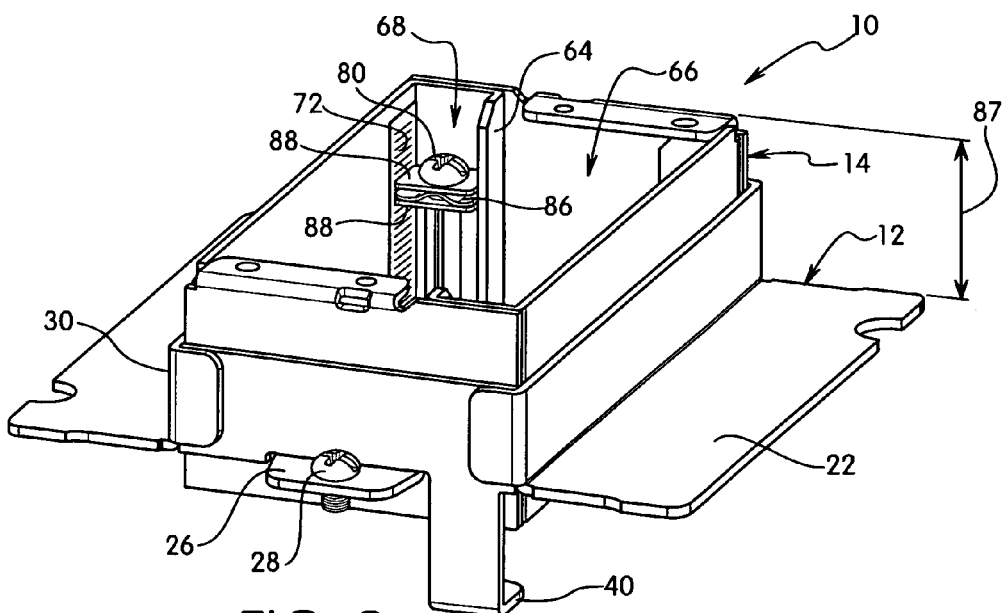
FIG. 2 is a perspective view of the electrical box cover plate of the embodiment of FIG. 1 showing the base and sleeve without the mounting plate.

The base 12 as shown in FIGS. 2, 3 and 5 has a central opening 20 with a shape corresponding to the shape of the sleeve 14. In the embodiment shown, the central opening 20 has a generally rectangular configuration with a dimension corresponding substantially to an electrical wiring device such as an electrical duplex receptacle. The base 12 in the embodiment shown has an outwardly extending flange 22 extending from opposite sides for mounting to the mounting plate 16 as shown in FIG. 1. In the embodiment shown, the flanges 22 extending outwardly from the longitudinal sides of the base and have a length extending substantially the entire length of the base. The transverse ends 24 include an outwardly extending tab 26 with a screw hole receiving a screw 28 for coupling the base 12 to the mounting plate 16. The base 12 includes a collar 30 that extends upwardly from the flanges 22 and surrounds the central opening 20. The collar 30 typically has a height corresponding to a standard width of wall panels such as the sheet rock used in construction. Preferably, the collar 30 has a height to position the electrical wiring device flush with the outer face of the wall surface.

The base 12 can be made from separate components as shown in FIG. 5 that are coupled together to form the base. Alternatively, the base can be formed from a single sheet of rigid material such as steel that can be bent and shaped to form the base. As shown in FIG. 5, the base is formed from two side walls 32 having a flange 22 extending substantially perpendicular to the side walls 32. The longitudinal ends of the side walls 32 include a tab 34 bent in the opposite direction of the flanges 22 and extend substantially perpendicular to the plane of the side walls 32. The transverse ends of the base 12 are formed by end walls 36 having a height complementing the height of the side walls 32. The end walls 36 have a longitudinal length corresponding to the finished width of the base 12. The tab 26 extends outwardly from the end walls 36 in a direction substantially perpendicular to the plane of the end walls. The end walls 36 have a leg 38 extending in a downward direction. Preferably, the legs 38 lie in the plane of the end walls 36. Each leg 38 has an inwardly extending tab 40 with a screw hole 42. The tabs 34 on the side walls 32 are attached to the longitudinal ends of the end walls 36 by welding or other fastening means to form the base 12. In the embodiment shown, the legs 38, tabs 40 and side wall 36 are formed from a single piece that is bent to the finished from. The legs 38 preferably are formed in the same plane as the plane of the side walls 36.

Referring to FIG. 4, the sleeve 14 in the embodiment illustrated is formed from separate parts that are attached to form the sleeve. Longitudinal end walls 44 have a length corresponding to the dimension of the opening 20 in the base 12 and a height for sliding within the opening 20 to adjust the position of the electrical device with respect to the base and the electrical box. As shown in FIG. 4, the top edge of the end walls 44 have an inwardly extending flange 46 with a centrally located screw hole 48 for receiving a mounting screw to attach the electrical wiring device to the flange 46. The sleeve of the embodiment of FIGS. 1-5 is a single gang device so that the screw hole 48 is centrally located between the longitudinal ends of the end walls 44. The flange 46 extends towards one longitudinal end of the end wall 44 and includes a screw hole 50 positioned at opposite corners of the finished sleeve 14. The screw holes 50 receive a coupling screw for attaching a sleeve extender as discussed hereinafter in greater detail.

The sleeve 14 includes longitudinal side walls 52 having a length corresponding to the length of the central opening 20 In one embodiment the sleeve 14 can have height corresponding to the height of the collar 30. Each side wall 52 has a first end 54 with a first inwardly extending flange 56 for coupling with the respective end wall 44. A second longitudinal end 58 includes a U-shaped flange 60 having a first leg 62 extending perpendicular from the plane of the side wall 52 and an inwardly extending second leg 64 extending parallel to the plane of the side wall 52 and projecting into the axial passage 66 of the sleeve 14. The second leg 64 is spaced from the side wall 52 to form a longitudinal channel 68 that extends in the axial direction of the passage 66. In the embodiment shown, the channels 68 are formed at opposite corners on each side wall 52. The opposing faces 70 of the channel 68 include a rough surface area 72. The first flange 56 and the first leg 62 are attached to the inner faces of the end walls 44 by welding or other suitable means. The bottom end of the channel 68 preferably includes an inwardly extending tab 74 with a central opening 76 for receiving an adjustment fastener such as a screw 78.

The adjustment screw 78 includes a head 80 and a threaded end 82. The threaded end 82 is received in the threaded screw hole 42 in the tab 40 as shown in FIGS. 7 and 8. In the embodiment shown, the screw 78 includes a cylindrical bushing 84 having a bottom end that contacts the tab 40. The bushing 84 is received in the opening 76 in the tab 74 of the sleeve 14 so that the sleeve 14 slides relative to the bushing 84 and screw 78. The bushing 84 has an axial bore that receives the screw 78 so that the screw 78 is able to rotate within the bushing 84. The bushing 84 and the screw 78 have a longitudinal length to position the head 80 of the screw 78 towards the top end of the collar 30 so that the screw is accessible to the user. A locking member 86 is positioned between opposing washers 88 at the top end of the screw 78 between the head 80 and the top edge of the bushing 84 as shown in FIGS. 8 and 9. The screw 78, bushing 84 and the locking member 86 are positioned in the channels 68 of the sleeve 14 as shown in FIGS. 7 and 8 so that the sleeve is able to slide through the central opening 20 of the base 12 to the desired position indicated by arrow 87 in FIG. 1. The screw 78 is then tightened to compress the washer 88 against the spring locking member 86 between the screw head 80 and the top end of the bushing 84. The compression causes the locking member 86 to expand outwardly to engage the rough surface 72 of the channel 68 to lock the sleeve 14 in a fixed position with respect to the base 12.

The locking member 86 in the embodiment shown is a spring member as shown in FIGS. 12-14. The locking member 86 has a curved shape with a convex outer surface forming an apex 90 with a hole 92 passing through the apex 90. The central curved portion of the locking member 86 has outwardly extending legs 94 with a distal end 96. Referring to FIGS. 8 and 9, the spring locking member 86 assumes a relaxed shape between the washers 88 to allow the sleeve 14 to slide up and down with respect to the screw 78. The sleeve 14 is moved to the selected position and the screw 78 is then tightened by threading into the screw hole in the tab 40 to compress the locking member 86 to the position shown in FIGS. 10 and 11. By compressing the locking member 86 between the washers 88, the legs 94 flatten and bend outwardly into engagement with the opposing surfaces of the channel 68 to secure the sleeve 14 in place with respect to the base.

In an alternative embodiment shown in FIGS. 15-19, a locking spring 100 has a substantially V-shape and includes a first leg 102 and a second leg 104 extending from an apex 106. The legs 102 and 104 are biased outwardly away from each other as shown in FIGS. 15 and 17. Each leg has a hole 111 extending there through for receiving the adjustment screw 78. The second leg 104 has an outer end with an upwardly turned flange 108 for contacting the opposing surface of the channel 68. The first leg 102 has a length greater than the second leg 104 with an outer edge 110 opposite the apex 106. As shown in FIG. 15, the adjustment screw 78 passes through the holes 111 in the first and second legs to position the locking spring 100 within the channel 68. In the expanded position shown in FIG. 15, the sleeve 14 is able to slide in an up and down direction with respect to the base 12. The screw 78 is tightened by threading into the threaded hole 42 in the tab 40 to compress the locking spring 100 as shown in FIG. 16 whereby the outer edge 110 of the first leg 102 and the apex 106 engage the opposing surfaces of the channel 68 to lock the sleeve 13 with respect to the base 12.

During use, the mounting plate 16 is attached to the electrical box 18 which can be attached to a support member such as a wall stud. The wall surface such as a layer of sheet rock is applied to the wall stud in a conventional manner with an opening dimensioned to receive the collar 30. The electrical wiring device is attached to the top end of the sleeve 14 and the sleeve is positioned within the central opening 20 of the base 12 to position the top end of the sleeve 14 and the electrical wiring device at the outer surface of the wall covering. The screw 78 is then tightened to fix the position of the sleeve 14 with respect to the base 12.

Figure 20:
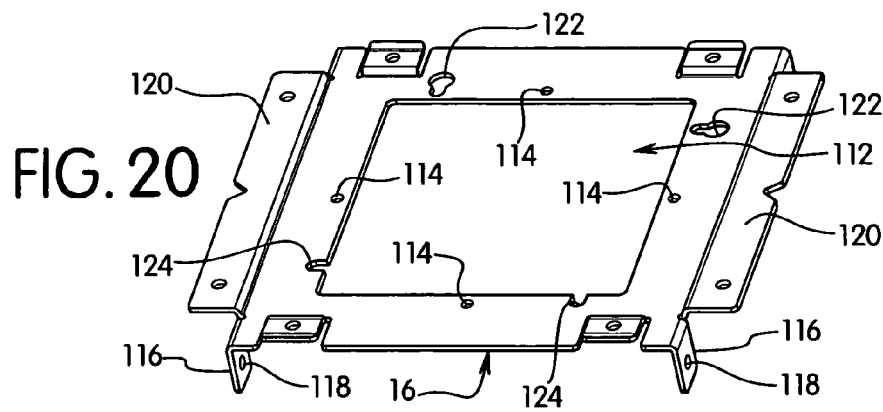
FIG. 20 is a perspective view of the mounting plate in one embodiment.
Figure 21:
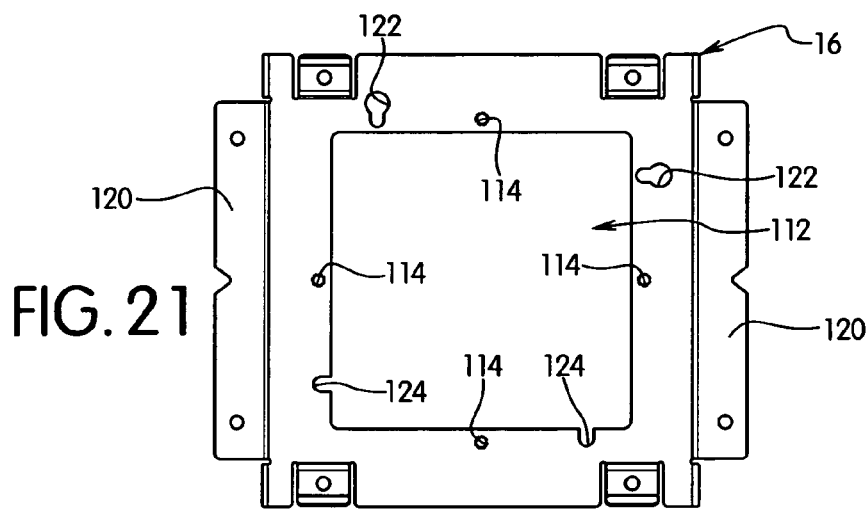
FIG. 21 is a top plan view of the mounting plate of FIG. 20.

The mounting plate 16 as shown in the embodiment of FIG. 20 has a substantially square configuration with a square central opening 112. The opening 112 has a dimension to receive the base 12 and sleeve 14 and support the electrical wiring device. Each of the four side edges around the central opening 112 includes a centrally located screw hole 114 for receiving the mounting screw 28 for coupling the base 12 to the mounting plate 16. The outer corners of the mounting plate 16 including downwardly extending tabs 116 for attaching to the electrical box by screws or other fasteners extending through the hole 118 in the tabs 116. An outwardly extending mounting flange 120 extends from opposite ends of the mounting plate 16 for attaching the mounting plate to a support structure such as a wall stud. Keyhole shaped slots 122 and slots 124 are provided on the top face of the mounting plate 16 for attaching the mounting plate 16 to the coupling screws on the top end of the electrical box 18 in a conventional manner.

Figure 22:
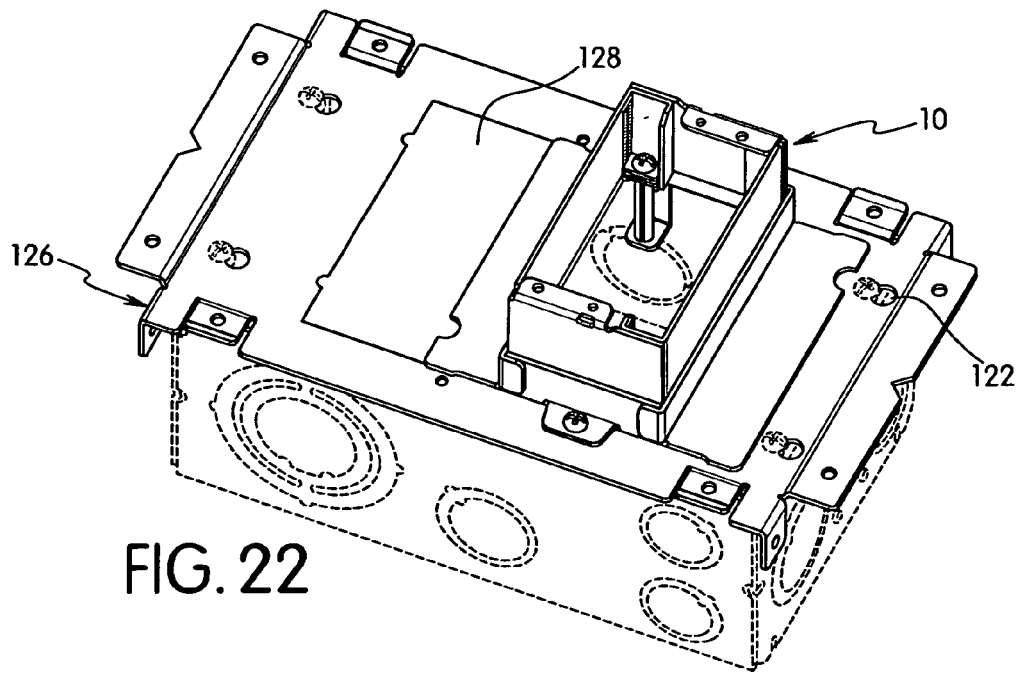
FIG. 22 is a perspective view of the cover plate mounted on the mounting plate.

In the embodiment of FIG. 22, the box cover 10 can be attached to a mounting plate 126 which is attached to an electrical box 18. The mounting plate 126 is similar to the mounting plate 16 with the exception of the dimensions such that the mounting plate 126 is capable of supporting a multi gang device. The mounting plate 126 has removable panels 128 that can be selectively removed by breaking the frangible lines to enlarge the central opening in the mounting plate 126. In the embodiment shown in FIG. 2, two screw holes 114 are provided on each of the opposing sides of the mounting plate next to the central opening to selectively position the box cover 10 or to accommodate a two gang box cover 130 or a three gang box cover 132 shown in FIG. 24.

Figure 25:
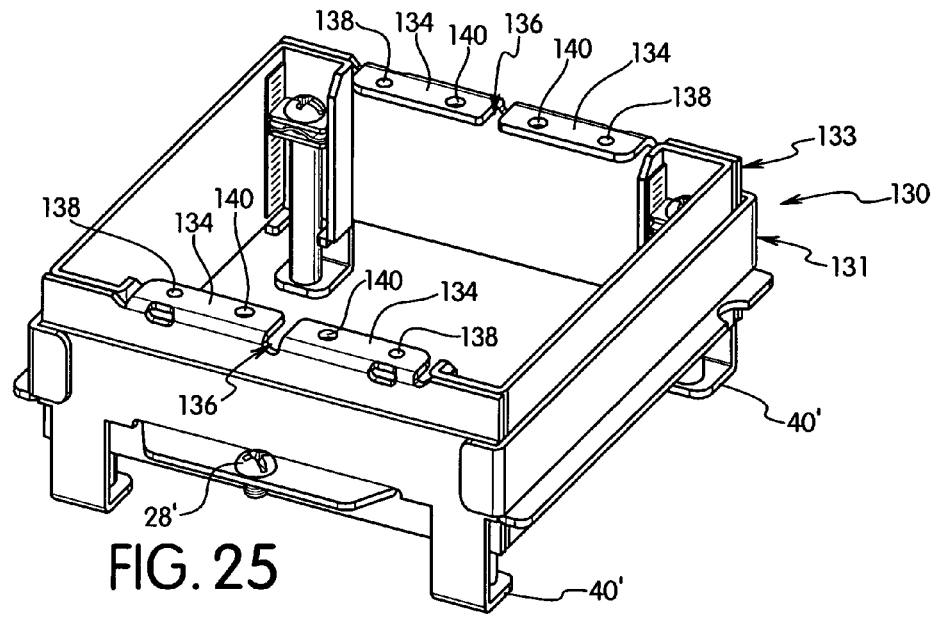
FIG. 25 is a perspective view of the two gang cover in the retracted position.
Figure 26:
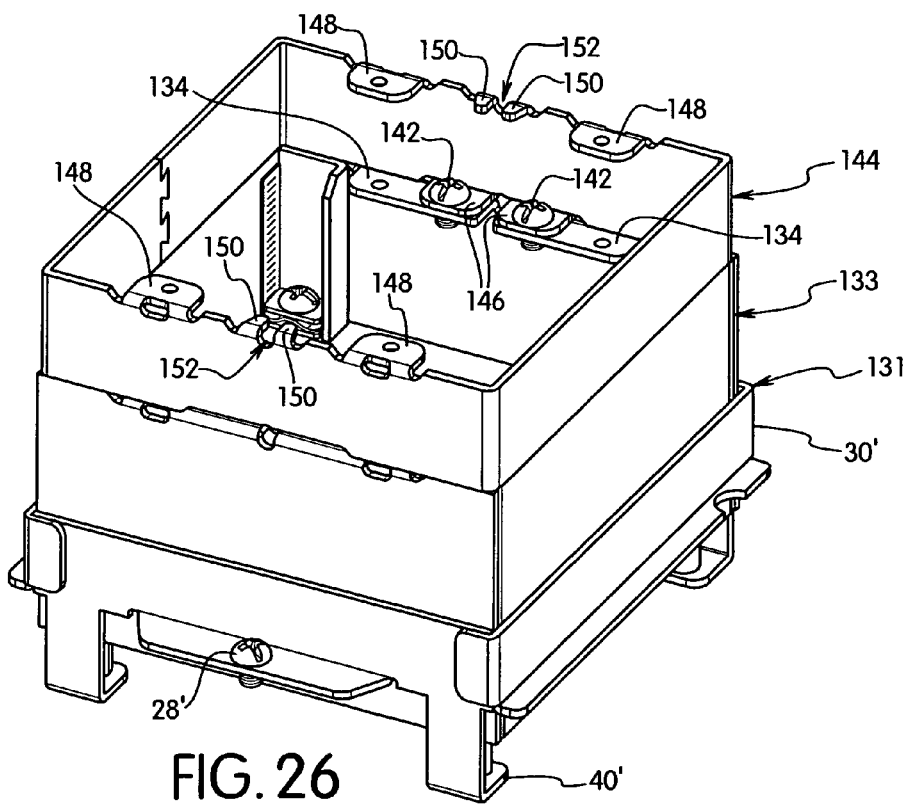
FIG. 26 is a perspective view of the two gang cover with an extension ring coupled to the movable ring.
Figure 27:
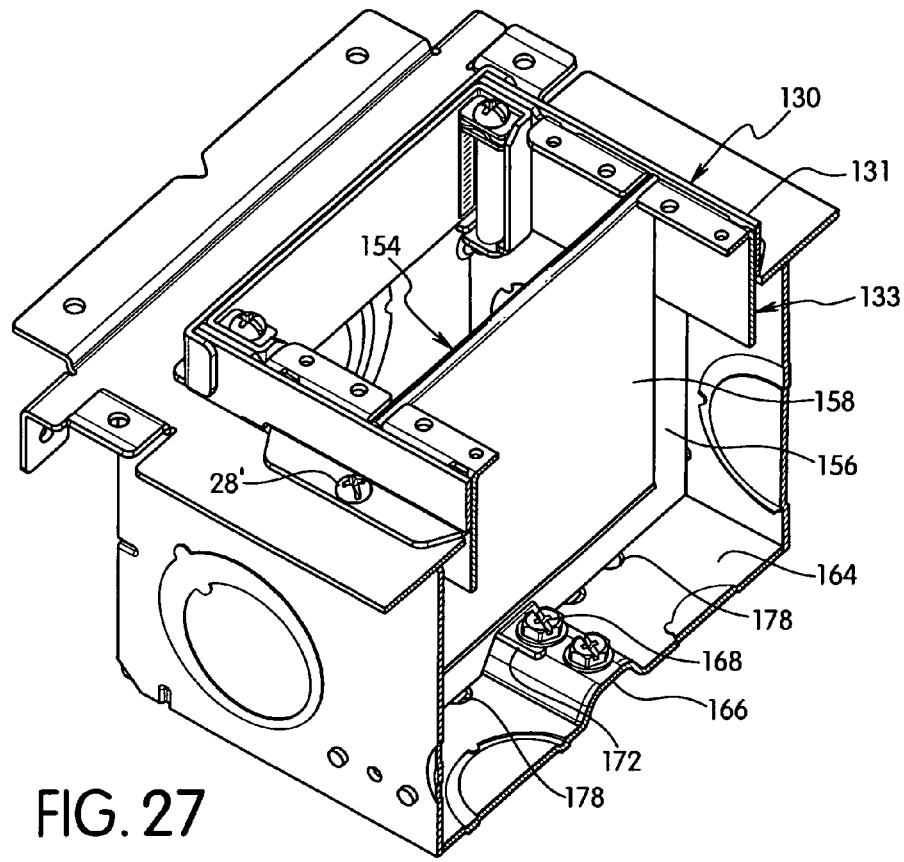
FIG. 27 is a partial cross sectional view of the two gang cover showing the movable partition plate coupled to the movable sleeve.

The two gang box cover 130 shown in FIGS. 25-27 is similar to the three gang box cover with the exception of the dimensions for supporting several electrical wiring devices. Referring to FIG. 25, the two gang box cover 130 is substantially the same as the box cover 10. The base 131 and sleeve 133 are substantially the same as the base 12 and sleeve 14 so that the identical components are identified by the same reference number with the addition of a prime. The sleeve 133 is constructed in a similar manner as the sleeve 14 with the exception of having two mounting flanges 134 on opposing sides of the sleeve as shown in FIG. 25. The mounting flanges 134 are spaced apart a distance to form a slot 136. Each flange 134 has a threaded screw hole 138 for receiving a mounting screw of an electrical wiring device and an inwardly spaced screw hole 140 for receiving a coupling screw 142 for coupling an extension ring 144 as shown in FIG. 26. The extension ring 144 has a dimension corresponding to the shape and dimensions of the sleeve 133 to increase the height of the sleeve depending on the dimensions of the wall surface and the position of the electrical box. The extension sleeve 144 includes inwardly extending tabs 146 with a screw hole for receiving the screw 142. The top end of the side walls include inwardly extending tabs 148 for mounting the electrical wiring device. Inwardly extending prongs 150 are positioned toward the center of the side walls of the extension ring to define a slot 152 therebetween.

Figure 28:
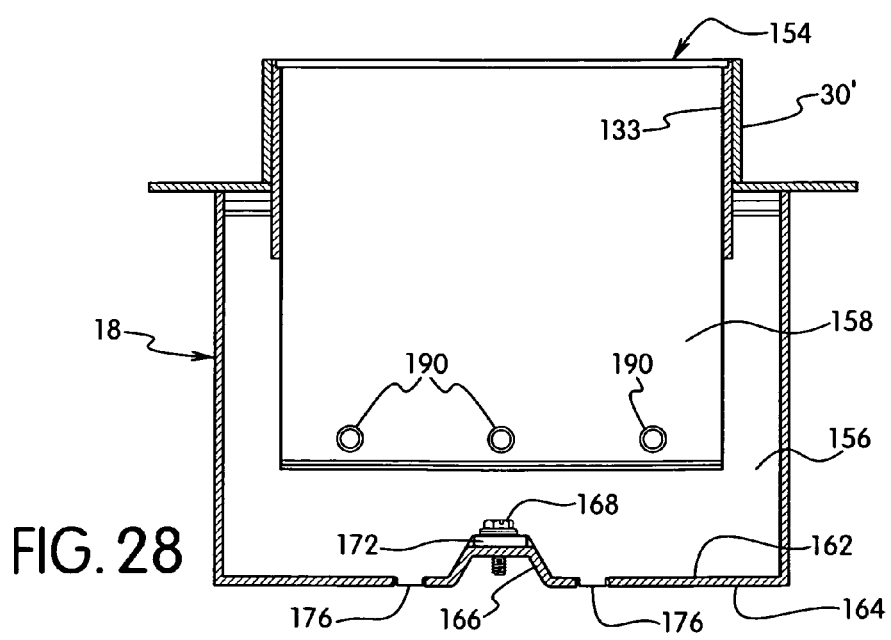
FIG. 28 is a cross sectional side view of the two gang cover of FIG. 27.
Figure 29:
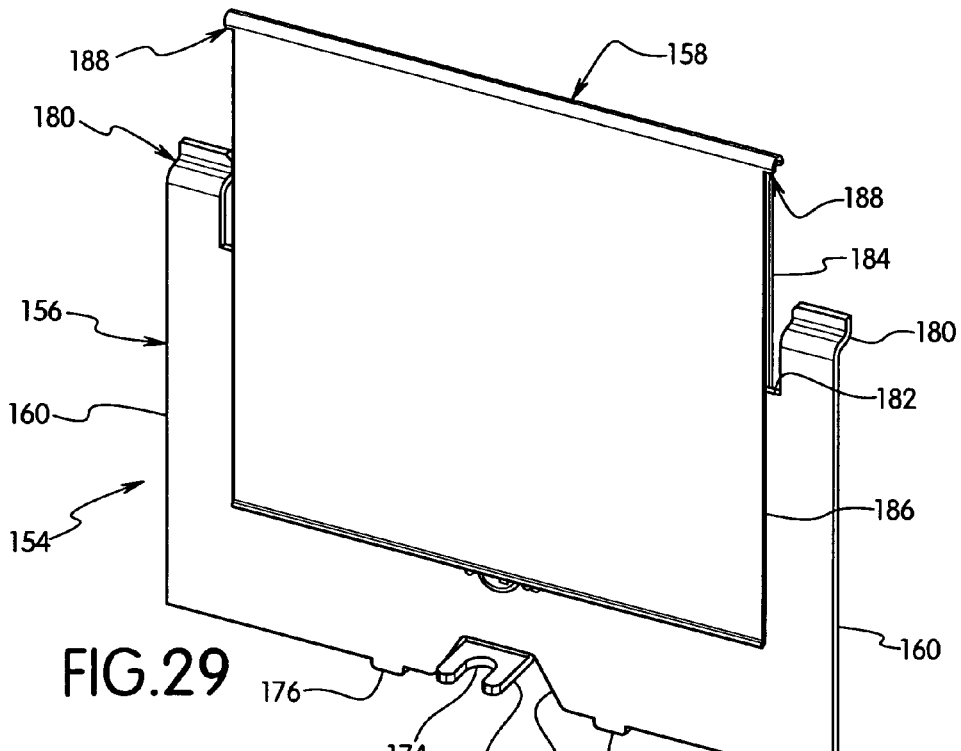
FIG. 29 is a perspective view of the partition plate of the invention.
Figure 30:
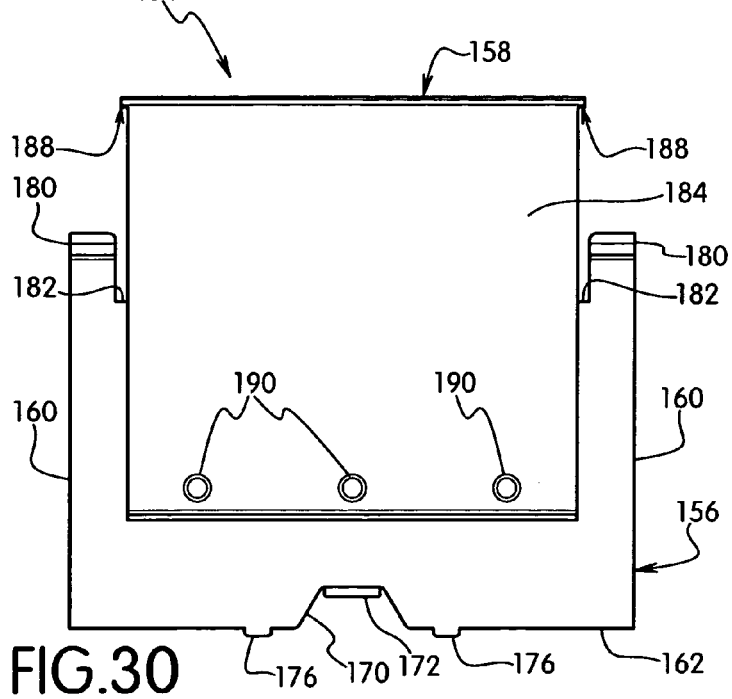
FIG. 30 is a side view of the partition plate of FIG. 29.
Figure 31:
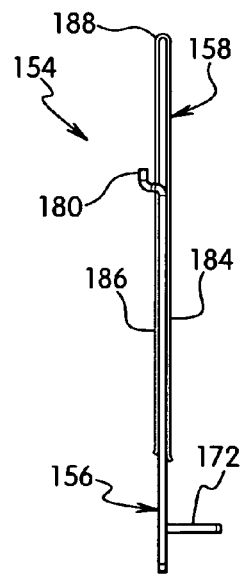
FIG. 31 is an end view of the partition plate of FIG. 29.

A divider plate 154 can be mounted within the electrical box 18' as shown in FIGS. 27 and 28. The divider plate 154 divides the electrical box into separate compartments as required by electrical codes to separate various wiring devices. For example, high voltage wiring devices can be separated from low voltage wiring devices by the divider plate and the respective wiring for the devices. The divider plate 154 as shown in FIG. 28 includes a first plate 156 and a movable plate 158. The first plate 156 has a dimension to fit within the cavity of the electrical box so that the longitudinal edges 160 contact the inner face of the side walls of the electrical box and a bottom edge 162 for contacting the rear wall 164 of the electrical box. In the embodiment shown, the rear wall 164 of the electrical box has a raised centrally located portion 166 for receiving ground screws 168. The bottom edge 162 of the plate 156 has a recess 170 sown in FIGS. 29 and 30 corresponding to the shape of the raised portion 166. A coupling tab 172 having a U-shaped slot 174 extends perpendicular to the plane of the plate 156 at the uppermost portion of the recess 170 as shown in FIG. 28. Downwardly extending projections 176 are received in corresponding holes 178 in the rear wall 164 to position and stabilize the plate 156 within the electrical box. One of the ground screws 168 passes through the U-shaped slot 174 to secure the first plate 156 within the electrical box so that the first plate 156 is retained in a fixed position.

The top edge of the plate 156 has an offset portion 180 to avoid interference with the mounting screws 28' used for coupling the mounting plate 126 to the mounting plate 16. The top edge of the plate 156 has a recessed portion 182 for receiving the movable plate 158 and the sleeve as shown in FIG. 28.

The movable plate 158 in the embodiment shown slides along the plane of the plate 156. In the embodiment shown, the movable plate 158 slide in a telescoping manner relative to the fixed plate 156. The movable plate 158 is formed of a sheet metal that is bent into a substantially U-shape having a first leg 184 and a second leg 186. The movable plate 158 has a width corresponding to the dimensions of the sleeve to form a divider between the two compartments of the electrical box. The top end of the movable plate 158 has outwardly extending legs 188 that hook onto the top edge of the sleeve within the slot 136 or to the slot 150 of the extension sleeve 144. The bottom end of the second leg 188 includes inwardly extending dimples or detents 190 to frictionally engage the face of the first plate 156.

The divider plate 154 fits within the electrical box and the sleeve to divide the area within the electrical box and the box cover into two separate compartments. The legs 188 hook to the top edge of the sleeve so that upward and downward movement of the sleeve with respect to the base causes the movable plate 158 to slide along the length of the first plate 156. The first plate 156 is fixed in the electrical box while the movable plate 158 moves with the movement of the sleeve so that the divider plate 154 is expandable with the movement of the sleeve. The divider plate can be used with the embodiment of FIG. 26 by hooking the legs 188 within the slot 152 of the extension ring 144. In this manner, the movable plate 158 slides over the first plate 156 by movement of the sleeve 14' and the extension ring 144. The movable plate extends through the slot 136 formed between the mounting flanges 134 of the sleeve 14'.

Figure 24:
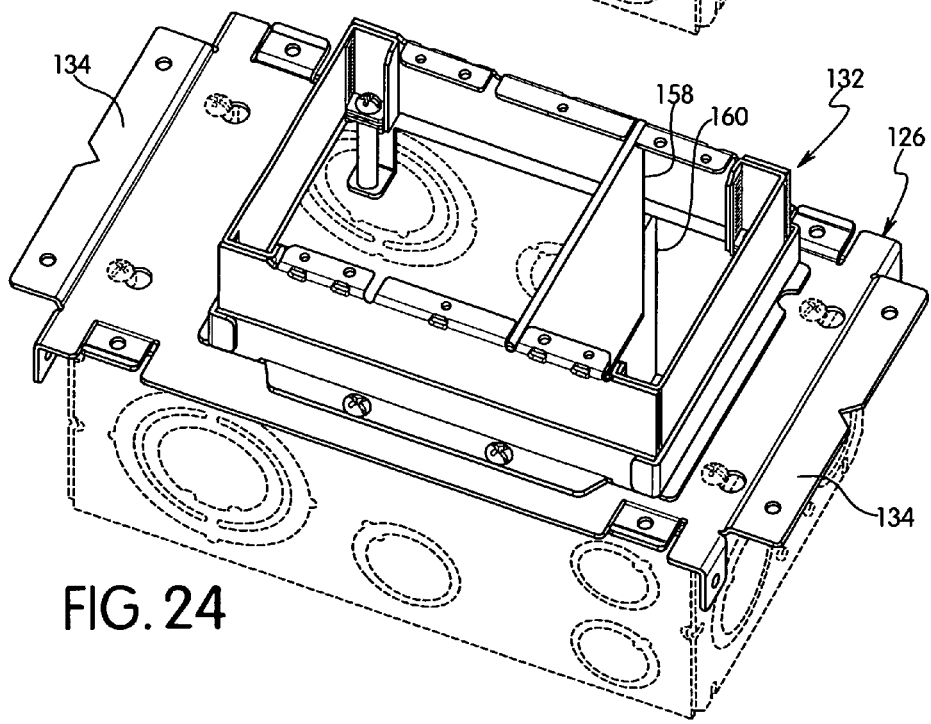
FIG. 24 is a perspective view of a three gang cover and mounting plate.

In the embodiment shown in FIGS. 25-27, the box cover is a two gang device having a single divider plate 154. The divider plate can also be incorporated in the three gang unit as shown in FIG. 24. Although a single divider plate 154 is shown in FIG. 24, the three gang unit is configured for receiving two divider plates to divide the unit into three separate compartments.

While various embodiments have been chosen to illustrate the invention, it will be understood by those skilled in the art that various changes and modifications can be made by one of ordinary skill in the art without departing from the spirit and scope of the invention as defined in the appended claims.

What is claimed is:

1. An electrical box cover for coupling an electrical device to an electrical box, said cover comprising:
   a base configured for coupling to an open end of the electrical box having a top side, a bottom side, an opening defining an axial passage, and having an inwardly extending tab positioned in said opening and spaced from said bottom side of said base;
   a movable sleeve received in said axial passage of said base, said sleeve having flanges configured for supporting an electrical wiring device within said sleeve and adjusting the position of the sleeve and electrical wiring device relative to said base, said sleeve having an axial passage;
   a fastener positioned in said sleeve and coupled to said tab; and
   a spring coupled to said fastener in said sleeve, said fastener configured for moving between an unlocked position and a locked position to compress said spring and deflect said spring outwardly to engage an inner surface of said sleeve to lock the position of said sleeve relative to said base.

2. The electrical box cover of claim 1, wherein
   said tab includes a threaded screw hole, and said fastener is a screw received in said threaded hole and said spring has an axial hole and said screw being received in said axial hole.

3. The electrical box cover of claim 2, further comprising a bushing having an axial passage receiving said screw, said bushing being positioned between said tab and spring, where rotation of said screw relative to said tab compresses said spring to expand radially outward to engage said inner surface of said sleeve.

4. The electrical box cover of claim 3, wherein
   said spring has a substantially U-shape with a pair of legs, each of said legs having a hole receiving said screws.

5. The electrical box cover of claim 3, wherein
   said spring has an apex with a first leg and a second leg with a hole extending through said apex for receiving said screw whereby said compression of said spring causes said legs to expand radially outward.

6. The electrical box cover of claim 1, wherein said base comprises a collar surrounding said opening in said base and extending upwardly from said top side for receiving said sleeve.

7. The electrical box cover of claim 1, wherein said sleeve includes a channel on an inner surface of said sleeve and extending in an axial direction with respect to said sleeve, said channel having an open side facing inwardly into an axial passage of said sleeve, and said channel being configured to receive said spring.

8. The electrical box cover of claim 7, wherein said channel has two opposing inner faces for engaging outer edges of said spring when said spring is compressed.

9. The electrical box cover of claim 1, wherein said sleeve has a substantially rectangular configuration with a first corner with an axial channel having an inwardly open side receiving said screw and spring.

10. The electrical box cover of claim 1, further comprising a divider coupled to said movable sleeve for dividing said movable sleeve into at least two compartments, and where said divider is coupled to said movable sleeve for axial movement with said movable sleeve with respect to said base.

11. The electrical box cover of claim 10, wherein said divider is expandable between a retracted position and an extended position.

12. The electrical box cover of claim 1, further comprising a divider having a first divider plate in a fixed position with respect to said base, and a second movable divider plate coupled to said movable sleeve for moving with said sleeve relative to said base.

13. The electrical box cover of claim 12, wherein said first divider plate is coupled to said second divider plate for moving between a retracted position and an extended position.

14. An electrical box cover for an electrical box, said cover comprising:
a base configured for coupling an open end of an electrical box, said base having an opening extending between a top side and a bottom side;
a movable sleeve having an axial passage and being received in said opening in said base;
a locking member coupled to said base for locking the position of said sleeve with respect to said base; and
a divider configured for dividing said opening in said base and dividing said axial passage in said sleeve, where said divider is expandable between a retracted position having a first height and extended position having a second height, and where a portion of said divider plate is movable with movement of said movable sleeve.

15. The electrical box cover of claim 14, wherein said divider comprises
a first divider plate; and
a second divider plate coupled to said movable sleeve for movement with movement of said movable sleeve.

16. The electrical box cover of claim 15, wherein said second divider is coupled to said first divider plate and being slidable with respect to said first divider plate.

17. The electrical box cover of claim 14, wherein said base has a tab extending inwardly into said opening; and
said locking member includes a screw threaded into a threaded hole in said tab, and a spring that expands outwardly to engage an inner surface of said sleeve when compressed to lock the position of said sleeve with respect to said base.

18. The electrical box cover of claim 17, wherein said movable sleeve includes a channel receiving said screw and spring, said channel having a pair of opposing sides and an open side open to said axial passage.

19. The electrical box cover of claim 18, wherein said movable sleeve has an inwardly extending flange in said axial passage and spaced from a side wall of said sleeve to form said channel.

20. The electrical box cover of claim 18, further comprising
a bushing having an axial bore receiving said screw, said bushing being positioned between said tab and said spring whereby rotating said screw compresses said spring against said bushing causing said spring to expand outwardly.

21. An adjustable mounting assembly for an electrical outlet box, said assembly comprising:
a base with an opening and a tab extending into said opening;
a sleeve received in said opening for sliding axially within said opening and having an axial passage configured to support an electrical wiring device; and
a fastener and compressible locking member coupled to said tab and being positioned in said axial passage of said sleeve, said locking member being movable between an unlocked and locked position and being configured to engage an inner surface of said sleeve in the locked position to lock said sleeve in place, and said sleeve has a channel on an inner surface for receiving said fastener and locking member.

22. The adjustable mounting assembly of claim 21, wherein
said base has a top surface and a bottom surface, said tab being spaced below said bottom surface a distance to enable said sleeve to slide in said opening of said base.

23. The adjustable mounting assembly of claim 21, wherein said locking member is a spring configured to expand radially outward by said fastener compressing said spring in the locked position.

24. The adjustable mounting assembly of claim 23, wherein
said spring has a first leg and a second leg connected at an apex, each of said legs having a hole for receiving said screw.

25. The adjustable mounting assembly of claim 23, wherein
said spring has a first leg and second leg connected at an apex, said apex having a hole receiving said screw whereby compression of said spring causes said legs to expand radially outward.

26. The adjustable mounting assembly of claim 23, further comprising
a bushing positioned between said tab and said spring.

27. The adjustable mounting assembly of claim 21, further comprising
a divider configured to separate said axial passage into at least two compartments.

28. The adjustable mounting assembly of claim 27, wherein
said divider is coupled to said movable sleeve for movement with said sleeve.

29. The adjustable mounting assembly of claim 27, wherein said divider includes a first divider plate in a fixed position with respect to said base, and a movable second divider plate coupled to said sleeve.

30. The adjustable mounting assembly of claim 29, wherein said second mounting plate is coupled to said first mounting plate for sliding movement relative to said first mounting plate.

\* \* \* \* \*